United States Patent [19]

Kawasaki et al.

[11] 4,117,080

[45] Sep. 26, 1978

[54] PROCESS FOR REGENERATING PERMANGANATE AND/OR MANGANATE FROM MANGANESE DIOXIDE

[75] Inventors: Hideo Kawasaki; Masaji Nakatani; Toshihiro Ishii; Hiroshi Nakagawa; Hiroshi Takaya, all of Tokyo, Japan

[73] Assignee: Nissan Engineering Ltd., Tokyo, Japan

[21] Appl. No.: 791,995

[22] Filed: Apr. 28, 1977

[30] Foreign Application Priority Data

May 7, 1976 [JP] Japan .................................. 51-52545

[51] Int. Cl.$^2$ ............................................ C01G 45/12
[52] U.S. Cl. ..................................... 423/235; 423/599
[58] Field of Search .................. 423/235, 49, 50, 599, 423/605

[56] References Cited

U.S. PATENT DOCUMENTS

| 1,247,278 | 11/1917 | Kaplan | 423/605 |
|---|---|---|---|
| 1,826,594 | 11/1931 | Bellone | 423/49 |
| 2,940,823 | 6/1960 | Reidies et al. | 423/49 X |
| 3,927,177 | 12/1975 | Okabe et al. | 423/235 |
| 4,001,372 | 1/1977 | Okabe et al. | 423/235 |

FOREIGN PATENT DOCUMENTS 118,232  2/1900  Fed. Rep. of Germany ........... 423/599

*Primary Examiner*—G. O. Peters
*Attorney, Agent, or Firm*—Oblon, Fisher, Spivak, McClelland & Maier

[57] ABSTRACT

$NO_x$ is absorbed in an alkaline aqueous solution of a permanganate and/or a manganate and the manganese compounds are reduced to form the precipitate of manganese dioxide.

The manganese dioxide is dispersed in an aqueous solution of sodium or potassium hydroxide having a concentration of higher than 20% and a gas containing $NO_x$ having a molar ratio of $NO_2/NO_x$ of higher than 0.55 is contacted with the dispersion in the presence of a permanganate and/or a manganate at higher than 40° C, to convert manganese dioxide to the permanganate and/or the manganate.

9 Claims, No Drawings

PROCESS FOR REGENERATING PERMANGANATE AND/OR MANGANATE FROM MANGANESE DIOXIDE

BACKGROUND OF THE INVENTION

1. Field of the Invention

The present invention relates to a process for regenerating a permanganate and/or a manganate from manganese dioxide discharged from the process for removing $NO_x$ by using the permanganate and/or the manganate.

2. Description of the Prior Art

In a process for absorbing $NO_x$ in an exhaust gas into an alkaline aqueous solution of a manganese oxoacid salt such as potassium permanganate or potassium manganate, the manganese compounds are included in the discharged wastes which causes pollution.

The inventors have studied and proposed to prevent the precipitation of manganese dioxide in a chemical reaction, however it has not been succeeded to prevent the discharge of manganese (VII) (VI) compounds which are discharged with the resulting nitrate and nitrite.

Heretofore, the manganese (VII) (VI) compounds have been reduced to manganese dioxide in pH of about 8, and the precipitated manganese dioxide has been separated and it has been oxidized from $Mn^{+4}$ to $Mn^{+6}$ by an alkali fusion and it has been further oxidized from $Mn^{+6}$ to $Mn^{+7}$ by an electrolytic oxidation to attain the regeneration. The process has not been economical to combine it in a line of processes for treating the exhaust gas from the viewpoints of the apparatus and the running cost.

SUMMARY OF THE INVENTION

It is an object of the present invention to provide a process for regenerating manganese (VII) (VI) compounds which is used for absorbing $NO_x$ from an exhaust gas.

Another object of the present invention is to provide a process for converting manganese dioxide to a permanganate and/or a manganate in economical.

The foregoing and other objects of the present invention have been attained by dispersing manganese dioxide in an aqueous solution of sodium or potassium hydroxide having a concentration of higher than 20 wt.% and contacting the dispersion with a gas containing $NO_x$ having a molar ratio of $NO_2/NO_x$ of more than 0.55 at the temperature of higher than 40° C in the presence of a permanganate and/or a manganate.

DETAILED DESCRIPTION OF THE PREFERRED EMBODIMENTS

The inventors have studied to oxidize manganese dioxide to manganese oxoacid salts and have found that the reaction (1) could be rapidly performed in certain condition without an alkali fusion and the reaction (2) could be combined to obtain a permanganate.

Reaction(1):

Reaction(2):

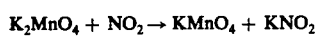

The conditions of the reaction (1) were studied by experiments.

That is, aqueous solutions of sodium hydroxide having concentrations of 10 to 30% were respectively prepared and manganese dioxide was dispersed in each solution and each dispersion was heated to 50° C and a specific amount of potassium permanganate was added to the dispersions and the mixtures were stirred for 30 minutes. The conversions of $Mn^{+6}$ were measured. When the concentration of sodium hydroxide was higher than 20%, the conversion of $Mn^{+6}$ was higher than 80% (as shown in Table 1).

Manganese dioxide was dispersed in each 30% aqueous solution of sodium hydroxide and the dispersions were respectively heated at 20° C, 40° C, 50° C or 80° C and potassium permanganate was added to them and the mixtures were stirred for 30 minutes. The conversions of $Mn^{+6}$ were measured.

When the temperature was higher than 40° C, the conversion was higher than 80%. (as shown in Table 2).

Table 1

| Concentration of NaOH (%) | Yield of $Mn^{+6}$ (%) |
|---|---|
| 10 | 18 |
| 15 | 55 |
| 20 | 80 |
| 30 | 86 |

Table 2

| Temperature (° C) | Yield of $Mn^{+6}$ (%) |
|---|---|
| 20 | 10 |
| 40 | 80 |
| 50 | 86 |
| 80 | 90 |

In accordance with the basical experiments, it has been attained to provide the process for continuously regenerating a permanganate and/or a manganate which comprises dispersing manganese dioxide in an aqueous solution of potassium or sodium hydroxide having a concentration of higher than 20% in the presence of a permanganate at higher than 40° C. In the reaction (2), $NO_2$ is contacted with the reaction mixture of the reaction (1) which can be carried out as a semi-continuous process.

It has been found that $NO_x$ gas having a molar ratio of $NO_2/NO_x$ of higher than 0.55 preferably higher than 0.7 can be used in the process of the present invention.

When the process of the present invention is combined with the process for removing $NO_x$ with an alkaline aqueous solution of a permanganate and/or a manganate, the rational process can be attained.

That is, the exhaust gas containing $NO_x$ is contacted with the alkaline aqueous solution of a permanganate and/or a manganate to absorb $NO_x$ and then, the permanganate and/or the manganate in the solution is reduced to precipitate manganese compounds as manganese dioxide is separated and is regenerated a permanganate and/or the manganate by the process of the present invention and the solution containing the permanganate and/or the manganate is continuously fed into the $NO_x$ absorbing solution whereby the trouble of manganese compound in the discharge of the nitrate and the nitrite can be prevented. The process of removing $NO_x$ could be accomplished.

EXAMPLE

In an absorbing apparatus, $NO_x$ was absorbed in an alkaline aqueous solution of potassium permanganate and manganese compounds were reduced to manganese dioxide. The manganese dioxide was separated and dried and dispersed in 30% aqueous solution of sodium hydroxide at a ratio of 3 wt.% and the dispersion was heated to 50° C, and 1.5 wt.% of potassium permanganate was added to the dispersion. A gas containing 4,300 ppm of $NO_x$ ($NO_2$ content:85%) was contacted with the dispersion and the concentration of $Mn^{+6}$ and $Mn^{+7}$ was measured in comparison with those of non-contact of $NO_x$. The results are shown in Table 3.

Table 3

| Time (hr.) | 0 | 0.5 | 1 | 2 | 3 | 4 | 5 |
|---|---|---|---|---|---|---|---|
| Contact with $NO_x$ | 0.5 | 0.75 | 0.80 | 0.90 | 1.05 | 1.05 | 1.10 |
| Non-contact with $NO_x$ | 0.5 | 0.75 | 0.75 | 0.75 | 0.75 | 0.75 | 0.75 |

The Table 3 shows that the oxidation from $Mn^{+4}$ to $Mn^{+6}$ was accomplished within 30 minutes and the concentration of the soluble manganese ions reached to 1.1 %.

The practical operation can be carried out as follows. An exhaust gas containing $NO_x$ is fed into the $NO_x$ absorbing apparatus wherein the alkaline aqueous solution of an alkali metal permanganate is contained (at a ratio of 0.5 wt.% as manganese ions). When $NO_x$ is absorbed, the alkali metal nitrate and nitrite are produced. A part of the resulting solution is discharged and is neutralized with a mineral acid whereby the remained manganese ions are reduced by the nitrite to form manganese dioxide. The manganese dioxide precipitate is separated and is charged into a regenerating apparatus wherein the aqueous solution of alkali metal hydroxide is contained at high concentration and the permanganate and/or the manganate is also contained. After introducing $NO_2$ into the dispersion to convert manganese dioxide to the permanganate and/or the manganate (at a ratio of 1.2 wt.% as manganese ions). A part of the solution is recycled to the $NO_x$ absorbing apparatus.

What is claimed is:

1. A process for producing at least one member selected from the group consisting of permanganates and manganates from manganese dioxide which comprises
    forming a dispersion of manganese dioxide in an aqueous solution of sodium or potassium hydroxide having a concentration of said hydroxide greater than 20% by weight,
    and contacting with said dispersion a gas containing $NO_x$ having a molar ratio of $NO_2/NO_x$ greater than 0.55 in the presence of at least one member selected from the group consisting of permanganates and manganates at a temperature above 40° C.

2. A process for removing $NO_x$ from an exhaust gas comprising
    absorbing $NO_x$ into an alkaline aqueous solution of at least one member selected from the group consisting of permanganates and manganates, whereby a waste solution containing manganese compounds is produced,
    reducing said manganese compounds whereby the manganese is precipitated as manganese dioxide, and
    converting said manganese dioxide into a permanganate or a manganate by the process of claim 1.

3. A process according to claim 2, wherein the concentration of base in said alkaline aqueous solution of at least one member selected from the group consisting of permanganates and manganates is in the range from 1 to 10 weight percent.

4. A process according to claim 3, wherein the concentration of base in said alkaline aqueous solution of at least one member selected from the group consisting of permanganates and manganates is in the range from 2 to 5 weight percent.

5. A process according to claim 1, wherein the concentration of manganese dioxide in said dispersion is in the range from 0.1 to 10 weight percent.

6. A process according to claim 5, wherein the concentration of manganese dioxide in said dispersion is in the range from 1 to 5 weight percent.

7. A process according to claim 1, wherein said member of the group consisting of permanganates and manganates in said dispersion of manganese dioxide is formed by oxidation of manganese dioxide in said dispersion.

8. A process according to claim 1, wherein said produced member selected from the group consisting of permanganates and manganates is added to said dispersion of manganese dioxide.

9. A process according to claim 2, wherein said produced member selected from the group consisting of permanganates and manganates is added to said alkaline aqueous solution which absorbs $NO_x$.

* * * * *